United States Patent [19]

Albert et al.

[11] 4,153,408

[45] May 8, 1979

[54] PROCESS FOR EXTRUSION BLOWING OF THERMOPLASTIC HOLLOW ARTICLES AND GRIPPER DEVICE FOR DRAWING THE PARISON INTO THE BLOW MOLD

[75] Inventors: Walter Albert, Frankfurt am Main; Manfred Dicks, Niedernhausen; Hans O. Schiedrum, Eppstein, all of Fed. Rep. of Germany

[73] Assignee: Hoechst Aktiengesellschaft, Frankfurt am Main, Fed. Rep. of Germany

[21] Appl. No.: 799,677

[22] Filed: May 23, 1977

[30] Foreign Application Priority Data

May 25, 1976 [DE] Fed. Rep. of Germany ....... 2623342

[51] Int. Cl.² ............................................ B29D 23/03
[52] U.S. Cl. .................................. 425/532; 425/529; 425/534
[58] Field of Search ............... 425/534, 532, 529, 4 C; 264/98, 99

[56] References Cited

U.S. PATENT DOCUMENTS 3,000,051  9/1961  Schaich .......................... 425/534 X
3,079,631  3/1963  Gasmire .......................... 425/534 X
3,596,315  8/1971  Yoshikawa et al. ............. 425/532 X

*Primary Examiner*—Richard B. Lazarus
*Attorney, Agent, or Firm*—Curtis, Morris & Safford

[57] ABSTRACT

To produce hollow articles of a thermoplastic by extrusion blowing a parison is transferred from the extruder die into the blow mold by means of a gripper device comprising two gripper arms which work hand-over-hand, alternatively grip the parison as it issues from the die and draw it at an adjustable take-off speed, which is greater than the speed of extrusion, into a blow mold waiting under the die, and the blow mold, after the gripper arm has passed the lower edge of the mold, closes about the parison still hanging from the die, the second gripper arm grips the parison just above the blow mold before the parison is severed between the upper edge of the mold and the gripper arm, the filled blow mold makes room for the next blow mold, the parison inserted in the mold is inflated in a manner which is in itself known to form the hollow body, the latter is released from the mold, and the entire sequence is repeated as a continuous set of cycles.

8 Claims, 3 Drawing Figures

PROCESS FOR EXTRUSION BLOWING OF THERMOPLASTIC HOLLOW ARTICLES AND GRIPPER DEVICE FOR DRAWING THE PARISON INTO THE BLOW MOLD

The invention relates to a process for extrusion blowing of hollow articles from a thermoplastic, preferably a foamed thermoplastic, the parison being drawn from the extruder die into the blow mold by means of a gripper device.

The invention further relates to a gripper device for drawing the parison from the extruder die into the blow mold.

Extrusion blowing has attained very great importance for the manufacture of hollow articles from thermoplastics. In extrusion blowing, an extruded parison, in the thermoplastic stage, is introduced into a blow mold in which it is molded by inflation, cooled and removed from the mold when the hollow article is cold. This process can also be used to convert plastics containing blowing agents into foamed hollow articles.

Some of the known extrusion blowing processes use single-arm or twin-arm gripper devices which carry the extruded parison into the opened blow mold. These devices are also capable of gripping several parisons simultaneously and transferring them from the die into the mold. The neck of the hollow article can either be premolded in the gripper by means of clamping jaws or claws or can be calibrated during blow-molding. It is also known to close the parison by welding, using clamping bars of the gripper, if appropriate whilst preinflating the parison with sufficient air to act as a support. It is also known to influence the wall thickness distribution of the parison in the lengthwise direction by varying the drawoff speed of the gripper, if appropriate simultaneously with a controlled adjustment of the gap width of the die or a change in the extruder output. Further, it is known to grip the parison at both ends, by means of a twin-arm gripper, and to stretch or shorten it whilst it is being introduced into the blow mold. At an appropriate temperature, the stretching can bring about an orientation of the parison in the lengthwise direction. The use of the gripper device for taking the blown hollow body from the blow mold and transporting it to transfer stations or stations where finishing operations are carried out is also known.

Furthermore, it is known to draw the parison off the extruder die alternately by means of at least two blow molds. In this case, the first blow mold receives an extruded parison from the die and after the mold halves have closed it draws the next parison off the die until the next blow mold can engage on this parison; this second blow mold now repeats the process. This procedure is described as the hand-over-hand method and does not require separate gripper devices.

It has been found that in using the known processes and devices with parisons which issue freely from the die and hang therefrom, the extrusion blowing of hollow articles from thermoplastics containing blowing agents frequently entails waste and production breakdowns. This also applies to processes with gripper devices which grip the parison (blank) at the upper end and introduce it, hanging freely, into the blow mold. The foaming-up of the thermoplastic extrudate after issuing from the die, and the resulting increase in volume, causes the parison to have undesirably large dimensions. Control of the wall thickness distribution of the tubular parison is not possible. Differing degrees of foaming which can result from slight temperature differences easily lead to oscillations of the parison. The oscillation of the freely hanging parison frequently makes it impossible to introduce the parison into the blow mold with precision. Undesirable pinch marks on the hollow article, laterally shifted bottom welds, wall thickness variations around the periphery of the hollow article, and flaws in the neck region, are encountered. If several parisons are extruded simultaneously, the oscillation can cause them to stick together and can therefore result in production stoppages. Excessive dimensions of the parison and inadequate control of the wall thickness distribution lead to waste and make it more difficult to manufacture perfectly reproducible hollow articles.

Processes in which the extruded parison is gripped at its initially free end, that is to say the end which issues from the die, by a single-arm device and is drawn thereby into the blow mold are also unreliable because of the oscillation of the freely extruded parison. It is therefore an object of the invention to provide a process and a device for reliably avoiding oscillations and hence avoiding a sideways shift of the parison.

It has now been found that the difficulties described can be avoided by a process for extrusion blowing of hollow articles of a thermoplastic, preferably a thermoplastic containing blowing agent, in which the parison is transferred from the extruder die into the blow mold by means of a gripper device, wherein two gripper arms of the gripper device, which work hand-over-hand, alternately grip the parison as it issues from the extruder die and draw it at an adjustable take-off speed, which is greater than the speed of extrusion, into a blow mold waiting under the die, and the blow mold, after the gripper arm has passed the lower edge of the mold, closes about the parison still hanging from the die, the second gripper arm grips the next parison just above the blow mold before the parison is severed between the upper edge of the mold and the gripper arm, the filled blow mold makes room for the next blow mold, the parison inserted in the mold is inflated in a manner which is in itself known, to form the hollow body, the latter is released from the mold, and the entire sequence is repeated as a continuous set of cycles.

Further, a gripper device for extrusion blow molds has been found, which consists of gripper jaws, which are movable scissors-like relative to one another, for drawing the extruded parison from the extruder die into a multi-part blow mold, in which device two gripper arms provided with gripper jaws are arranged so as to be able to execute a hand-over-hand to and fro movement parallel to the extrusion direction, their upper reversal points lie between the extruder die and the upper edge of the blow mold and their lower reversal points lie below the lower edge of the blow mold and a switch is provided on each lower reversal point and comes into engagement with the particular gripper arm present at the lower reversal point, and is connected with the blow mold and with the gripper arm which is present at the upper reversal point.

This process avoids the free issuing of the parison from the die. The parison is always drawn off the die in a guided manner. Oscillations and an excessive increase in the external dimensions when extruding thermoplastics containing blowing agents can be prevented reliably. The gripper arm is always able to grip the parison centrally and draw it with precision into the blow mold.

As a result of using an adjustable draw-off speed of the gripper, which is preferably higher than the extrusion speed, it proves possible to impart the requisite dimensions and desired weight to the parison. The increased draw-off speed stretches the parison preferably by at least 30%, and particularly preferentially by 50 to 200%, relative to the length of the freely extruded tube. If the draw-off speed of the parison during a cycle is graduated, it is possible to influence the wall thickness distribution in the lengthwise direction.

The free extrusion of plastics containing blowing agents is accompanied by a very large increase in volume, due to foaming, which hitherto demanded the use of very small dies. However, even with the smallest dies it was not possible to produce foamed parisons of very small diameters. In the process according to the invention, the increase in volume can substantially be compensated for by a higher draw-off speed, so that dies with larger dimensions can be used, which are easier to handle since the die core shows less movement in the event of pressure fluctuations. Furthermore, the draw-off speed can be used to match the external diameter of the parison to the dimensions of the blow mold, for example with a view to the length of the bottom weld, the neck diameter of the mold or the diameter of the calibrating-blowing mandrel. Furthermore it is possible to extrude parisons of different dimensions and different weights from one and the same die, by varying the draw-off speed. As a result, better control of the process is possible.

The process according to the invention makes it possible to sever the bottom tail, after closing the blow mold, by continuing the travel of the lower gripper tongs by a few millimeters. However, it is also possible to transfer the lower gripper arm with the mold into the blowing station and use the gripper to remove the blown hollow article from the mold and transfer it in an orderly manner to the finishing operation. This is advantageous, above all, in the case of very thin-walled foamed hollow articles, since these very lightweight articles are otherwise very difficult to bring into an orderly arrangement and to stack.

The process according to the invention can also be carried out with twin tube extrusion heads and multiple blow molds.

The drawings schematically show an apparatus suitable for carrying out the process according to the invention, without implying that the process is restricted to the use of this apparatus.

Figure 1:
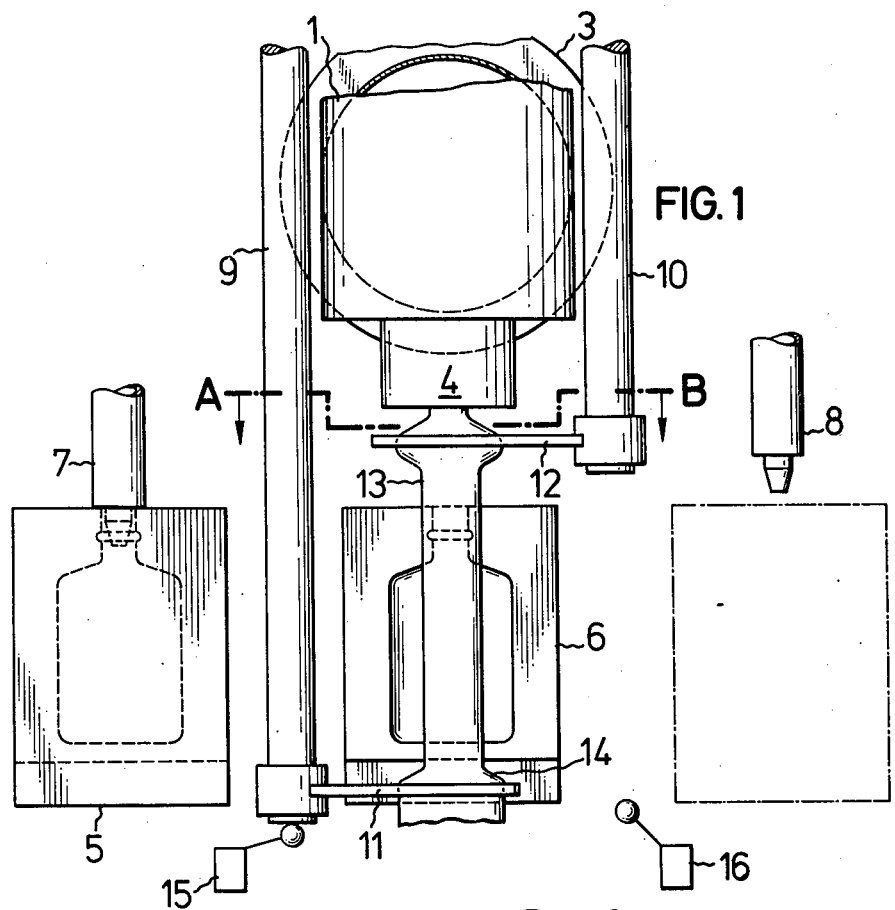
FIG. 1 shows a front view of the apparatus.

The numerals in the drawings denote the following:
(1) Tube extrusion head
(2) Extruder
(3) Flange between extruder and tube extrusion head
(4) Die
(5) and (6) Blow molds
(7) and (8) Blowing mandrels of the blowing stations
(9) and (10) The two arms of the gripper device
(11) and (12) The gripper jaws
(13) The tubular parison
(14) The tail
(15) and (16) Switches The process and the device will now be explained in more detail with the aid of the drawings.

FIG. 1 shows the tube extrusion head (1) with the die (4) and the extruded parison (13). The blow mold (5) is in the left-hand blowing station; the hollow article is inflated by means of the blow mandrel (7) and then released from the mold. The blow mold (6) is below the die (4). (For clarity of the representation, the front half of the blow mold (6) has been omitted from the drawing). The gripper arm (9) with jaws (11) has drawn the tubular parison downwards through the opened mold. When the gripper arm (9) has traveled downwardly sufficiently far it actuates a switch (15), which closes the mold (6) and the gripper jaws (12) of the gripper arm (10). Preferably, the gripper jaws (11) continue to travel a few more millimeters to pull off the tail (14) of the parison (13), and then open. A severing device which is not shown severs the tube between the upper edge of the mold (6) and the gripper jaws (12). The blow mold (6) is then transferred to the outlined position of the right-hand blowing station under the blowing mandrel (8). The blowing mandrel (8) is introduced into the parison and inflates it to form the hollow article. In the interim, the gripper jaws (11) have traveled upwards into the waiting position just below the die (4). The blow mold (5) which in the meantime has been opened and emptied travels from the left-hand blowing station to below the die (4); the gripper (10) with the gripper jaws (12) draws the next parison downwards through the open blow mold (5) and the cycle restarts.

Figure 2:
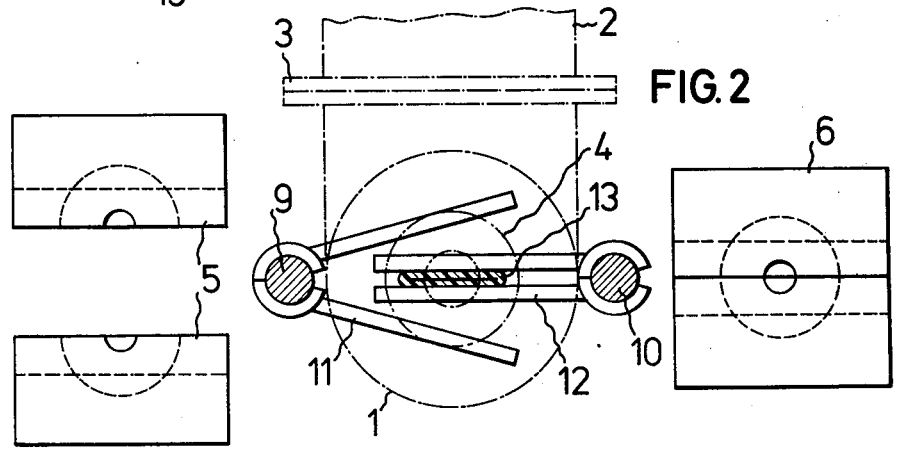
FIG. 2 shows the apparatus in section along A-B; the parts (1, 2 and 3) which are above the section plane are shown in broken lines.

FIG. 2 shows the apparatus in section along A–B of FIG. 1. The tube extrusion head (1) is connected to the extruder (2) by a flange (3). The mold (6) is in the right-hand blowing station. The mold (5) is open and ready to travel to below the die (4). The gripper arm (10) has seized the parison (13) by the gripper jaws (12), has pinched it and is traveling downwardly while the gripper arm (9) with open jaws (11), travels upwardly into the waiting position.

Figure 3:
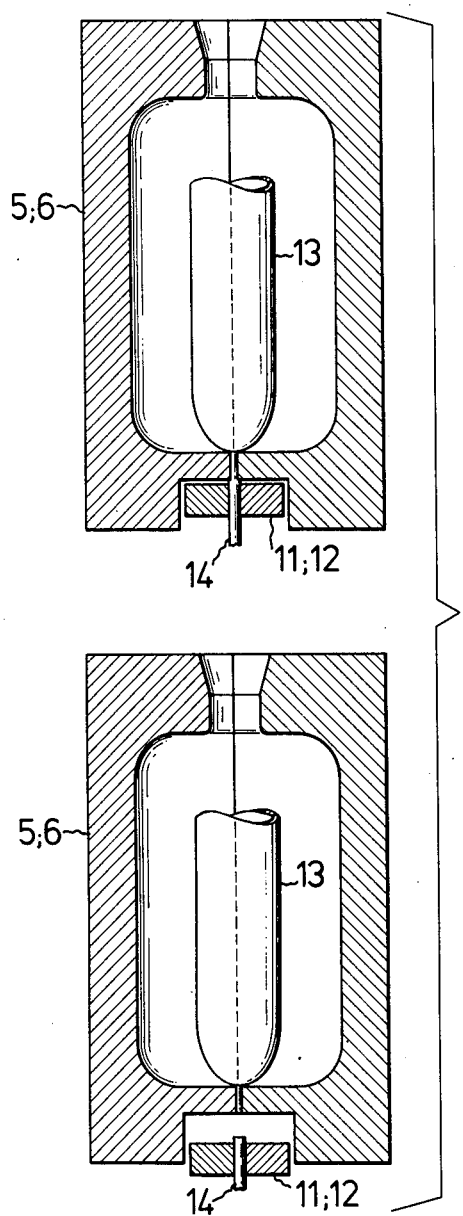
FIG. 3 shows the pulling-off of the tail by the gripper jaws.

FIG. 3 shows the tearing-off of the tail (14) by the gripper jaws (11) or (12). In the case of the molds shown here, the gripper jaws are brought as close as possible to the mold pinch line in order to keep the tail waste as low as possible.

What is claimed is:

1. A gripper device in an apparatus for forming a hollow article from a thermoplastic parison issuing from an extruder die used in cooperation with a multi-part partible blow mold mounted in said apparatus and having opposing halves which are movable between an open position in which said halves are disposed remotely about said parison and a closed position in which said halves enclose the parison, said device comprising first and second gripper arms mounted in said apparatus and positioned adjacent of said parison and substantially parallel thereto, said arms movably mounted for longitudinal reciprocal movement;

two pairs of gripper jaws respectively movably mounted on said gripper arms for movement of the jaws of each pair in a scissors-like manner in relation to one another between an open position in which said jaws are disposed remotely about said parison and a closed position in which said jaws grasp said parison;

arm moving means for cyclically and alternately moving said gripping arms between first and second positions wherein in said first position the pair of jaws of the gripper arm is between the extruder die and the edge of the blow mold nearer to said die and in said second position the jaws of the gripper arm are beyond the edge of the blow mold remote from the die;

jaw moving means for reciprocating said jaws between their open and closed positions in synchronism with the movement of said arms according to a predetermined sequence wherein the jaws of a gripper arm are closed after the arm arrives at said first position about the parison, held closed during movement of the arm from said first position to said second position, opened after the arm arrives at the second position, and held open during movement of the arm from the second to the first position, whereby the parison is sequentially drawn through the blow mold by said gripper arms.

2. A gripper device as defined in claim 1 including switching means mounted in the apparatus and respectively associated with each of said gripper arms at the second position thereof for engagement therewith; said switching means being operatively associated with said moving means for the gripper jaws for actuating said moving means when engaged by its associated gripper arm to move the pair of jaws on the other gripper arm from its open to its closed position.

3. A gripper device in an apparatus for forming a hollow article from a thermoplastic parison issuing from an extruder die, said device for use in cooperation with a multipart partible blow mold mounted in said apparatus and having opposing halves which are movable between an open position in which said halves are disposed remotely about said parison and a closed position in which said halves enclose the parison, said device comprising two gripper arms mounted in said apparatus which are substantially parallel to one another, and are disposed about said parison such that the longitudinal axes of the parison and arms are substantially parallel, each of said arms being movable back and forth along its longitudinal axis;

two pairs of gripper jaws respectively movably mounted on said arms for movement of the jaws of each pair in a scissors-like manner in relation to one another between an open position in which said jaws are disposed remotely about said parison and a closed position in which said jaws grasp said parison;

moving means mounted in said apparatus and in operative association with said gripper arms and gripper jaws for cyclically moving them from a first orientation to a second orientation to a third orientation, wherein in said first orientation an arm is positioned such that the pair of jaws associated therewith is between the extruder die and the edge of the blow mold nearer to said die, said pair of jaws being in the closed position and grasping the parison, and the other arm is positioned so that the pair of jaws associated therewith is beyond the remote edge of the blow mold, said pair of jaws being in the open position; wherein in said second orientation the arm associated with the pair of jaws in the closed position in the first orientation is positioned so that the pair of jaws is beyond the remote edge of the blow mold, said pair of jaws still being in the closed position, said pair of jaws having been closed during movement of the arm from the first to the second orientation whereby the parison is drawn through said blow mold in the open position, and the other arm is positioned so that the pair of jaws associated therewith is between the die and the nearer edge of the blow mold, said jaws now also being in the closed position but having been open during movement from the first to the second orientation; and wherein in said third orientation the arm associated with the pair of jaws in the closed position in the first orientation is positioned so that said pair of jaws is beyond the remote edge of the blow mold, said pair of jaws being in the open position, and the other arm is positioned so that the pair of jaws associated therewith is between the die and the nearer edge of the blow mold, said pair of jaws still being in the closed position;

switching means for engaging a gripper arm and actuating the moving means for the gripper arms and gripper jaws, said means being mounted in said apparatus and positioned to engage a gripper arm after the pair of jaws mounted thereon is at the remote edge of said blow mold but before the gripper arms and gripper jaws are in the second orientation, said switching means being operatively associated with the moving means for the gripper arms and gripper jaws to actuate the moving of the pair of jaws in the open position into the closed position upon said engagement.

4. A gripper device as defined in claim 3, wherein said moving means for the gripper arms and gripper jaws moves the arm associated with the pair of jaws in the closed position in the first orientation from the first orientation to the second orientation at a speed greater than that at which the parison issues from the die, whereby said parison is stretched.

5. A gripper device as defined in claim 4, wherein said moving means moves said arm at a speed sufficient to cause the parison to be stretched by at least 30%.

6. A gripper device as defined in claim 5, wherein said moving means moves said arm at a speed sufficient to cause the parison to be stretched in an amount of from 50 to 200%.

7. A gripper device as defined in claim 4, wherein said moving means moves said arm from the first to the second orientation at at least two different speeds, whereby the external diameter, weight or wall thickness, or a combination thereof, of the parison is controllably varied.

8. A gripper device as defined in claim 4, wherein the means for moving the gripper arms and gripper jaws moves them to an orientation intermediate between the second and third orientations, wherein in said intermediate orientation the pair of jaws which is beyond the remote edge of the blow mold in the second orientation is in the closed position, said pair of jaws remaining closed during movement of the arm from the second to the intermediate orientation, and the associated arm is positioned so that said pair of jaws is sufficiently distant from said blow mold to have snapped the parison at a point between said blow mold and the pair of jaws.

* * * * *